Aug. 25, 1942.  W. J. BRETH ET AL  2,294,020
METHOD OF AND APPARATUS FOR CUTTING CONTINUOUS STRIP PLASTIC MATERIAL
Filed Jan. 8, 1940  6 Sheets-Sheet 2

INVENTORS
WALTER J. BRETH
BY  MAX ENGLER
Evans + McCoy
ATTORNEYS

Aug. 25, 1942.      W. J. BRETH ET AL      2,294,020
METHOD OF AND APPARATUS FOR CUTTING CONTINUOUS STRIP PLASTIC MATERIAL
Filed Jan. 8, 1940      6 Sheets-Sheet 4

INVENTORS
WALTER J. BRETH
BY   MAX ENGLER
Evans & McCoy
ATTORNEYS

INVENTORS
WALTER J. BRETH
MAX ENGLER
BY Evans + McCoy
ATTORNEYS

INVENTORS
WALTER J BRETH
MAX ENGLER
BY Evans + Meloy
ATTORNEYS

Patented Aug. 25, 1942

2,294,020

UNITED STATES PATENT OFFICE 2,294,020

METHOD OF AND APPARATUS FOR CUTTING CONTINUOUS STRIP PLASTIC MATERIAL

Walter J. Breth and Max Engler, Akron, Ohio, assignors to The General Tire & Rubber Company, Akron, Ohio, a corporation of Ohio Application January 8, 1940, Serial No. 312,870

42 Claims. (Cl. 164—48)

This invention relates to a method of and apparatus for cutting continuous flexible strip material into pieces, and more particularly to improvements in the method of and apparatus for uniformly and accurately cutting a continuous strip of plastic rubber vehicle tire tread stock into tread strips of predetermined length.

A principal object of the invention is to provide a method of forming tread stock strips and apparatus for carrying out the method in which the strips are successively cut from the continuously advancing end of a composite strip of flexible rubber material and after being cut the severed ends of the strips are separated to prevent their adhering together.

Another object is to provide a continuous strip cutter in which the cutting blade moves with the advancing strip to be cut during the severing operation and remains between the severed ends of the strips until the same have been separated from one another.

Another object is to provide a conveyor system for a continuous strip cutter which includes a discharge conveyor for receiving cut strips, in which the speed of the receiving or discharge conveyor is momentarily increased after each severing of the strip material so as to withdraw the severed piece or strip from the end of the continuous strip.

Another object is to provide a method of and apparatus for forming tread stock strips in which an advancing strip of rubber material is reversely bent or twisted to dispose the ultimate inner side thereof uppermost and a strip of cushion rubber stock is applied to the upturned inside surface of the tread rubber to form a composite continuous strip which is subsequently cut into pieces of predetermined length.

Machines have heretofore been employed for the purpose of cutting an advancing strip of rubber into pieces of predetermined length for use in forming the tread of vehicle tires. The present invention is directed, therefore, to improvements in machines of this character and their method of operation so as to cut strips with greater accuracy and with greater speed and with the possibility of severed ends of the rubber strip adhering together reduced to a minimum. Among the improvements provided by the present invention is more accurate and precise means for actuating the cutter in response to a control governed by the movement of the advancing strip of plastic material, novel means for holding the reciprocable cutter carriage at its starting position until a length of strip material to be cut has been accurately measured, means for shifting the cutter blade laterally after the completion of the cutting operation to positively separate the cut ends of the strip material, and means for clamping the cutter carriage to the moving conveyor, in combination with means for applying an independent force to the carriage to advance the same with the conveyor. Other objects and advantages of the invention relating to features of construction and mode of operation, such as adjustable means for driving the conveyors whereby their relative speeds may be varied and the use of overrunning clutches in the initial impulse mechanism, as well as the flexibility of apparatus embodying the invention for use in cutting strip material of various shapes and sizes, will become apparent from the following detailed description of a suitable embodiment of the invention. In considering the disclosure it is to be understood that while the machine shown is particularly adapted to the cutting of strips of flexible rubber material for use as tire tread strips, the principles of the invention are equally applicable to machines of similar character for use in the cutting of various plastic strips into short pieces of fixed length for numerous other uses.

In the accompanying drawings illustrating a rubber tire tread assembly machine and cutter.

Referring to the drawings by letters and numerals of reference which indicate like parts throughout the several views, the apparatus of the present invention comprises a group of infeed conveyors I, assembling machine A, cutter C, and a discharge conveyor D. A continuous strip S of plastic rubber material is supplied to the infeed conveyors I from a suitable source of supply such as a calender, not shown, after having been passed over or through suitable apparatus, not shown, for cooling the same so that when the strip S is received by the first of the infeed conveyors I, indicated at 1, substantially all of the shrinkage which normally occurs in flexible rubber strip material of the character contemplated, will have taken place. The conveyor 1 may be an endless flexible belt, preferably of rubberized fabric material, which is carried on rotatable supporting or end members 3 and 4 journaled in bearings carried by a suitable supporting structure indicated at 5.

The first conveyor 1 advances the strip S onto a conveyor 6 which comprises a plurality of spaced parallel rotatable elements such as rolls 7. These rolls are horizontally disposed and mounted for rotation between spaced side support members 8 which are connected to one another by end or cross members 9 to form a conveyor frame for the rollers 7. This frame is pivoted at one end by a pin 10 secured to a cross member of the supporting structure 5 adjacent the discharge end of the first infeed conveyor 1. The end of the conveyor 6 opposite the pivot pin 10 is mounted on a transverse threaded rod or shaft 11 which is journaled in the supporting structure 5 and secured against endwise movement. This shaft is provided with a crank or handle 12, by means of which it may be rotated in either direction to shift one end of the roller frame sideways, there being a nut 14 secured to the frame and threaded on the shaft 11 to effect the lateral movement of the frame when the shaft is rotated. In this manner strip material "S" moving over the conveyor 6 can be steered or directed onto an endless belt 15 which forms the third part of the infeed conveyor. This belt may be formed of flexible rubberized fabric material and is trained around spaced rotatable end members or cylinders 16 and 17 which are mounted on horizontal shafts journaled in the supporting structure 5.

Figure 1:
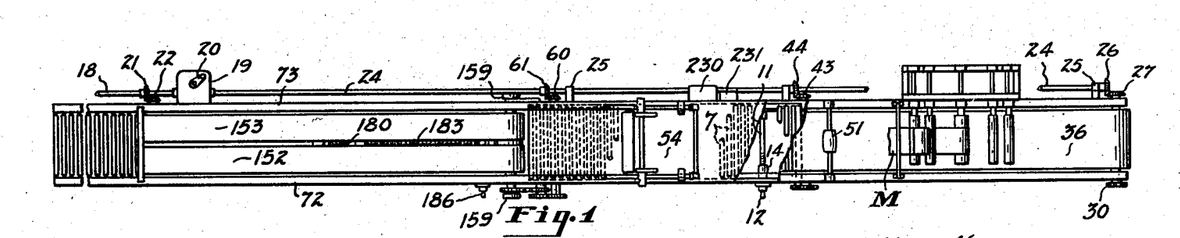
Figure 1 is a plan view on a reduced scale and with parts broken away showing the apparatus for assembling a composite rubber strip and cutting the same into equal lengths.

The conveyors of the apparatus are actuated by a driven shaft 18 (Figs 1 and 2), which terminates in a variable speed power transmission device indicated at 19, adjustment of which may be effected by means of a handle 20. Adjacent the end of the shaft 18 a bevel gear 21 is secured thereon and arranged to drive a bevel gear 22 which is secured on shaft 23 carrying the rotatable member 3 of the infeed conveyor belt 1. In this manner the infeed conveyor belt 1 is driven directly from the power shaft 18.

A shaft 24 is driven from the shaft 18 through the variable speed drive 19 and is mounted in journals 25 secured to the supporting structure 5. This shaft has mounted thereon a bevel gear 26 which meshes with a bevel gear 27 on a shaft 28 journaled on the supporting structure. The shaft 28 is disposed above and in parallel relation to shaft 29 also journaled on the supporting structure and which supports and drives the end member 17 for the infeed conveyor belt 15. A chain 30 is trained over sprockets 31 and 32 secured on the shafts 28 and 29, respectively, so that the shaft 29 is driven from the drive shaft 24 in a clockwise direction, as viewed in Fig. 2, the same as the shaft 23 which drives the infeed conveyor belt 1 is driven in a clockwise direction from the power shaft 18.

By suitable adjustment of the variable speed drive 19 the speed of the conveyor belt 15 can be adjusted to slightly less than that of the conveyor belt 1. In this manner a slight crowding together of the portion of the advancing rubber strip on the rollers 7 of the intermediate conveyor 6 can be effected. This crowding together of the advancing strip insures that the strip is shrunk or reduced to its minimum length for subsequent handling, thus minimizing shrinkage that might occur after the same had been cut into short strips for use in the formation of tire treads and compensating for such stretching of the strip as may have previously occurred.

As the rubber strip S moves off the end of the conveyor belt 15 it is carried upwardly and back over itself in a twist or reverse bend, indicated at 35, and onto an endless belt conveyor 36 which forms part of the assembling mechanism A. The belt 36 may be formed of any suitable flexible material, such as rubberized fabric or the like, and is supported by spaced parallel rotatable members or cylinders 37 and 38 which are mounted on shafts journaled in the supporting structure 5. Shaft 39 on which the rotatable end member 37 is secured carries a gear 40 which meshes with a gear 41 on a shaft 42 journaled in the supporting structure 5 in parallel relation to the shaft 39. A bevel gear 43 secured on the shaft 42 meshes with a bevel gear 44 on the drive shaft 24. Thus the conveyor belt 36 is driven in synchronism with the conveyor belt 15 of the infeed conveyor, the reversing gears 40 and 41 effecting rotation of the shaft 42 opposite the shaft 39, so that the strip S moves in opposite directions on the upper laps of the two conveyor belts.

An auxiliary supporting structure 45 carries supply or storage spindles 46 and driven spindles 47 on which may be mounted spools or rolls of relatively thin soft rubber strip material M, commonly referred to in the trade as cushion stock. The driven spindles 47 are actuated by means not shown so as to rotate in synchronism with the conveyor belt 36 to deliver cushion stock onto the strip material S advancing over the upper lap of the conveyor belt 36.

The strip S is disposed on the infeed conveyor I so that ultimate exterior surface 48 of the strip is uppermost. The reverse bend or twist 35, in the strip S, positions the latter so that ultimate internal surface 49 is positioned uppermost to receive the cushion strip M, see Fig. 8. A guide 50 positions the cushion strip M centrally on the upturned ultimate underside of the tread stock strip S and a rotatable weight 51 rolls over the cushion strip M to knead or press the same against the surface 49 of the tread stock S, thus compacting the two pieces of rubber material into a composite strip as they leave the end of the conveyor belt 36.

The cutting apparatus or mechanism C includes a flexible endless conveyor belt 54 which is supported by spaced parallel rotatable members or drums 55 and 56 supported by shafts 57 and 58, respectively, journaled in the supporting structure 5. The belt 54 may be of similar construction to the belts 1, 15 and 36 previously mentioned, preferably being formed of heavy rubberized fabric material which has a great tensile strength and stretches as little as possible. In practice it has been found that a conveyor belt material of rubberized fabric having a width of about 24 to 30 inches and a thickness of about ¼ to ⅜ inch is suitable. The conveyor belt 54 is driven from the drive shaft 24 through a transverse shaft 59 journaled in the supporting structure and having secured at one end a bevel gear 60 which meshes with a bevel gear 61 secured on the shaft 24. The end of the shaft 59 opposite the bevel gear 60 has secured thereon a gear 62 which meshes with a gear 63 secured on the shaft 57. In this manner the conveyor belt 54 is driven in synchronous relation to the conveyor belt 36, advancing the composite strip material S thereover toward the discharge conveyor D, to be later described.

As the composite strip S is advanced by the conveyor belt 54 it is measured and then severed by a knife or cutter 64 which is carried by or mounted upon a reciprocable carriage having spaced side members 65 and 66 which are disposed in upright positions on opposite sides of the upper lap of the conveyor belt 54 and in approximately parallel relation to one another. The upper ends of the side members are formed with journals 67 that receive a transverse shaft 68, the ends of which project beyond the journals and have secured thereon drive or semicircular rack members 69. The arcuate peripheries of these drive members are formed with teeth 70 which mesh with teeth of rack members 71 carried by spaced parallel side frame members 72 and 73 of the supporting structure 5. The racks 71 are disposed along opposite edges of the upper lap of the belt 54 in approximately parallel relation thereto and with their teeth facing upwardly. The sector shaped drive members 69 are thereby supported on the racks 71 so that the side members 65 and 66 of the carriage are in effect suspended or hung from the transverse shaft 68. Front and rear guide rollers 74 and 75 are rotatably mounted on spindles 76 secured in depending portions of the side members 65 and 66. These rollers engage the underside of horizontal portions of the frame members 72 and 73, thus steadying the carriage and guiding the same on its reciprocatory path.

Figure 8:
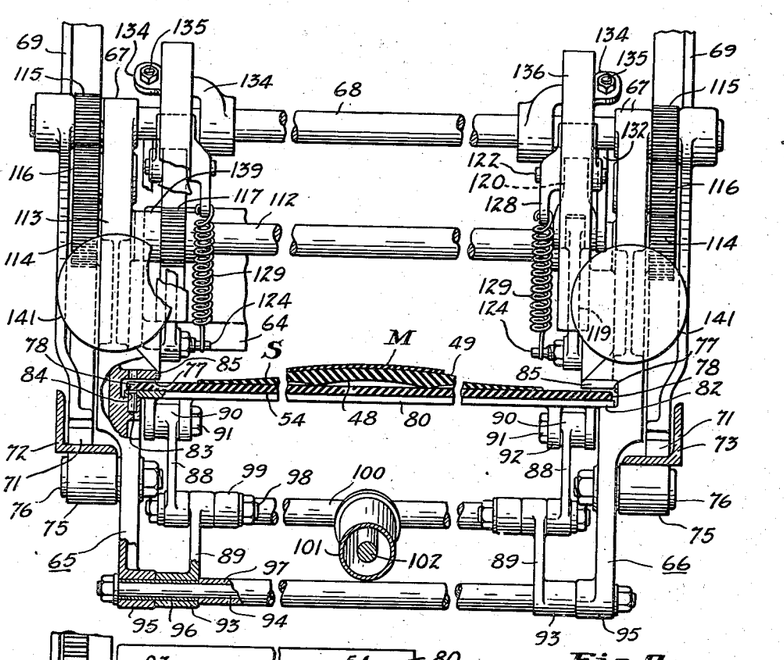
Fig. 8 is a transverse vertical section with parts broken away taken substantially on the line 8—8 of Fig. 4 and enlarged with respect thereto.
Figure 9:
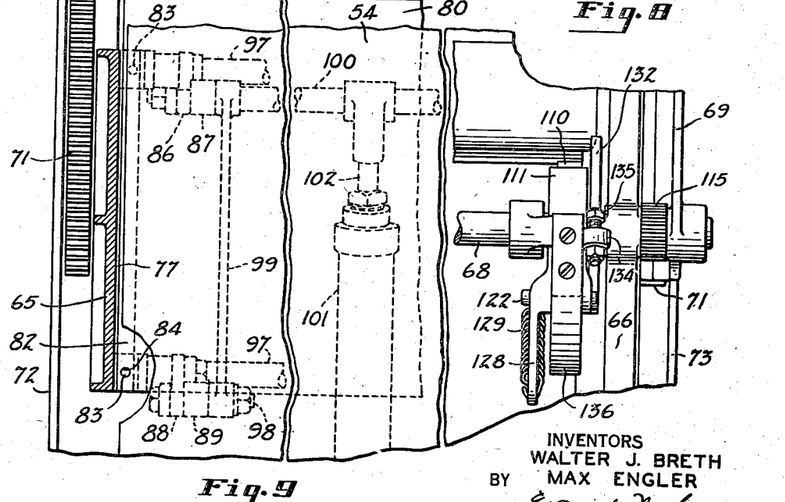
Fig. 9 is a fragmentary plan view, partly in section and with parts broken away, showing the carriage portion of the cutting apparatus illustrated in Fig. 8.

As shown in Fig. 8, the carriage members 65 and 66 are formed with horizontally disposed and longitudinally extending guide recesses or channels 77 which are opposed to one another and receive marginal edge portions 78 of the upper lap of the belt 54. Underneath the upper lap of the belt is disposed a platen or slide 80 which has an approximately flat upper surface and marginal edge portions 82 that extend into the guide recesses 77. Pins 83 are secured in the bottom walls of the guide recesses 77 and extend into apertures 84 formed in the marginal edges 82 of the slide 80 to prevent longitudinal shifting or displacement of the slide relative to the carriage members 65 and 66.

In order to insure synchronous movement of the carriage and the strip carrying lap of the belt 54, the slide 80 may be forced or displaced upwardly so that the marginal edges 78 of the belt are clamped between the edges 82 of the slide 80 and overhanging shoulders 85 of the carriage side members which form the upper walls of the guide channels 77. The movement of the slide 80 toward and away from the channel shoulders 85 is controlled by a toggle mechanism which comprises top and bottom links 86 and 87 at the front of the carriage and top and bottom links 88 and 89 at the rear of the carriage. A pair of the toggle links 86 and 87 is disposed adjacent each of the carriage side members 65 and 66 at the front end of the carriage, while a pair of the toggle links 88 and 89 is disposed adjacent each of the carriage side members at the rear end of the carriage. Upper ends 90 of the top links 86 and 88 are journaled on pin bolts 91 carried in brackets or ears 92 depending from the slide platen 80. Lower ends 93 of the bottom links 87 and 89 are pivotally carried by transverse bars 94 which extend across the carriage and have their ends secured in sockets 95 formed in depending portions of the side members 65 and 66. Suitable bushings 96 may be provided for the ends 93 of the links, and sleeves 97 may be placed over the central parts of the rods 94 to prevent shifting of the link ends 93 on the rods.

The adjacent ends of the rear toggle links 88 and 89 are pivotally mounted on common pivot pins 98 which also carry horizontal links 99 that extend forwardly therefrom, horizontally, and are pivotally received on a transverse bar 100 which pivotally receives the adjacent ends of the front toggle links 86 and 87. Through the interconnection of the front links with the rear links by means of the connecting links 99 and the connection of the links adjacent the carriage side members 65 with the links adjacent the carriage side members 66 by means of the cross member or bar 100, all of the toggle links act in unison so as to move all portions of the slide platen 80 uniformly and evenly toward and away from the belt engaging shoulders 78 of the side members.

Figure 4:
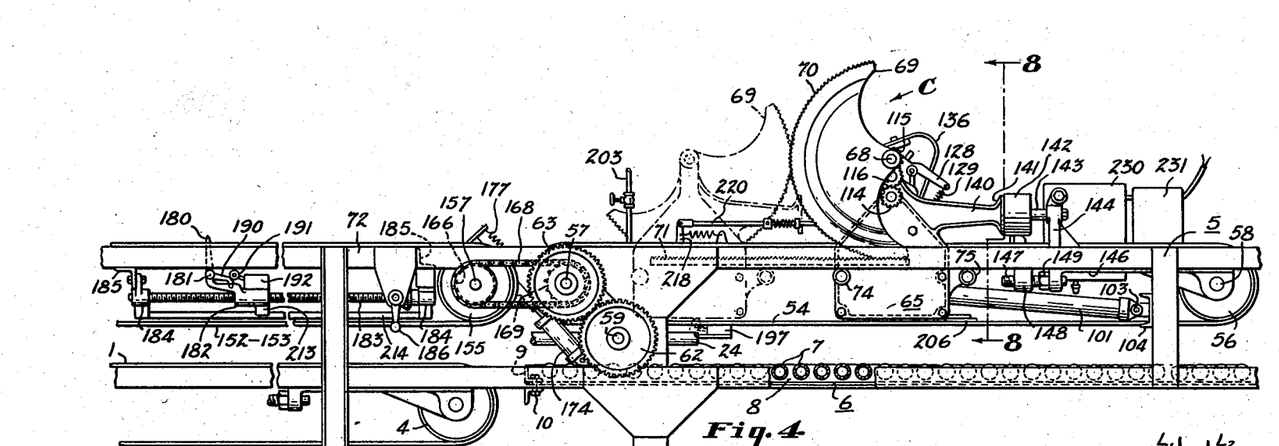
Fig. 4 is an elevational view, partly in section and with parts broken away, showing the cutting apparatus.

Actuation of the toggles to clamp the belt 54 between the slide 80 and shoulders 85 is effected by a pneumatic or hydraulic piston (not shown) working in a cylinder 101, the piston being connected to the cross member 100 by means of piston rod 102. As shown in Fig. 4, the cylinder 101 is pivoted at 103 to a cross member 104 of the supporting structure 5. Upon the introduction of high pressure fluid into the rear or right hand end of the cylinder 101, as viewed in Figs. 2, 4, 5, and 10, the piston rod 102 is forced to the left, simultaneously actuating all the toggle links 86, 87, 88, and 89, to force the slide platen 80 upwardly, clamping the belt 54 between the upper surface of the platen and the shoulders 85 of the carriage so that the carriage and upper lap of the belt are secured together and move in synchronism. In addition to actuating the toggle links to clamp the belt and the carriage together the piston rod 102 forces the carriage to the left, as viewed in the figures mentioned, which is the direction of movement of the upper lap of the belt 54 in advancing the strip material S. Thus, the hydraulic mechanism serves not only to actuate the carriage clamping mechanism but also to apply an initial impulse to start the movement of the carriage in synchronism with the belt and to retain the application of a positive carriage advancing force throughout the work or cutting stroke of the carriage. In this manner the inertia of the stationary carriage is not overcome entirely by the frictional engagement between the clamping means and the belt, so that slippage is minimized and control of the carriage can be more accurately maintained.

Figures 6, 7:
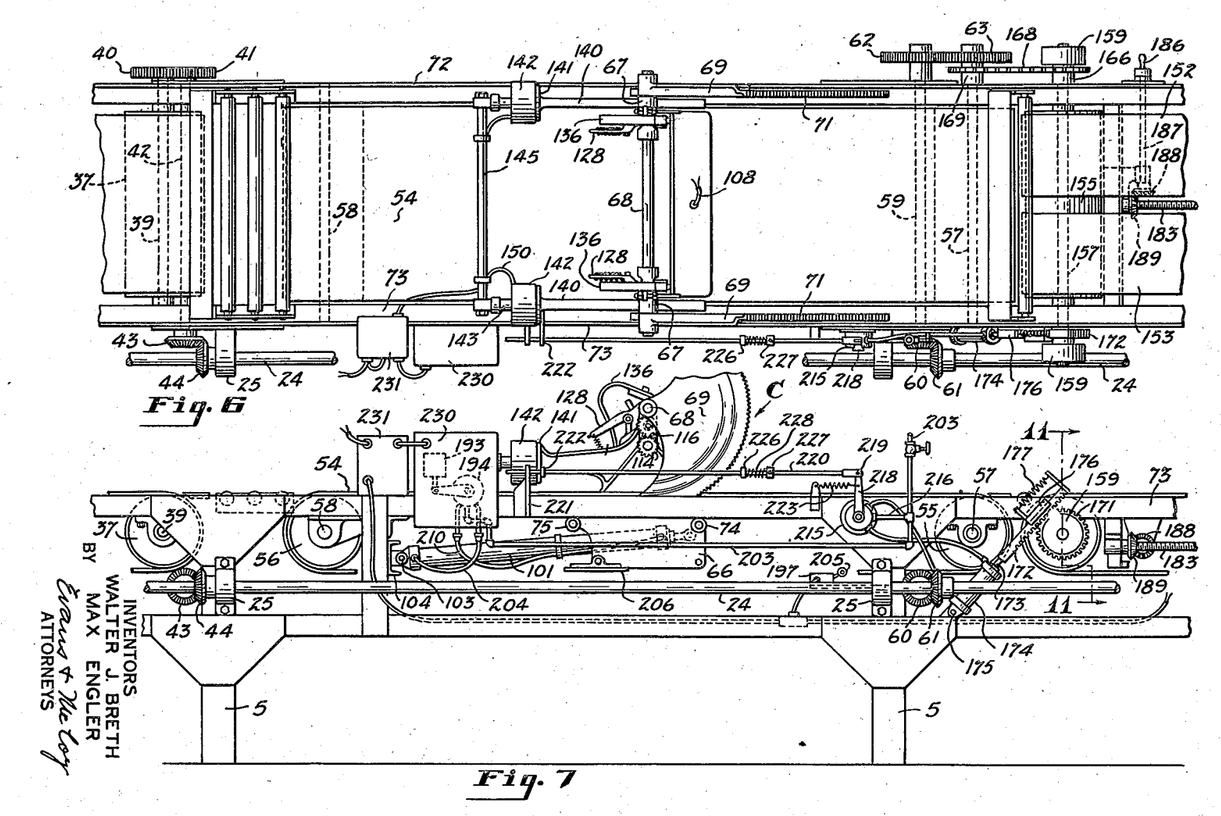
Fig. 6 is a top plan view with parts broken away of the cutter apparatus.
Fig. 7 is a side elevational view with parts broken away of the apparatus shown in Fig. 6.

The knife or cutter 64 is preferably heated by means of electric heating units or coils 107 connected to a source of electric current by means of conductors 108, Fig. 6, and is supported on a member 109 carried by reciprocable members 110 disposed in spaced parallel relation adjacent the side members 65 and 66 of the carriage. These reciprocable members are received in guide members 111 pivoted on a transverse shaft 112 journaled at 113 in the carriage side members. The ends of the shaft 112 extend beyond the carriage side members and have secured thereon gears 114 which are drivingly connected to gears 115 secured on the shaft 68 between the hubs of the drive members 69 and the journals 67, by means of intermediate idling gears 116 mounted on spindles secured in the carriage side members. Gears 117 are secured on the shaft 112 between the sides of the guides 111 and mesh with rack teeth 118 formed on the support members 110. Thus, as the carriage is reciprocated on the supporting structure, rotating the shaft 68 through the inter-engagement of the teeth 70 on the drive members 69 with the teeth of the supporting structure racks 71, the shaft 112 is rotated in the same direction as the shaft 68 to advance and retract the reciprocable knife carrying supports 110.

Figure 10:
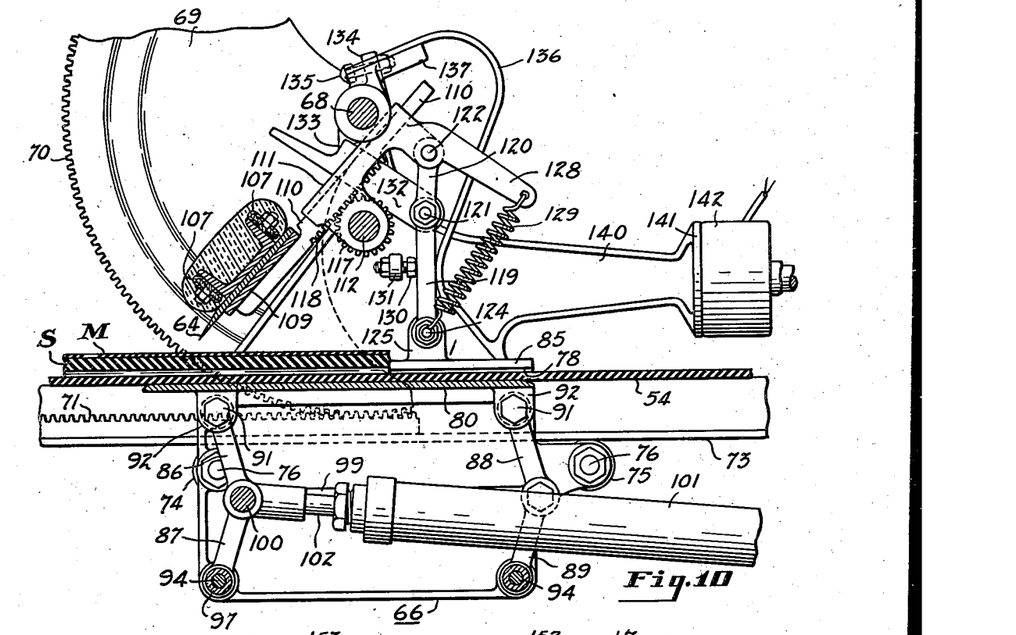
Fig. 10 is a sectional detail with parts broken away showing the cutter carriage as the same is retained in starting position by the holding means.
Figure 14:
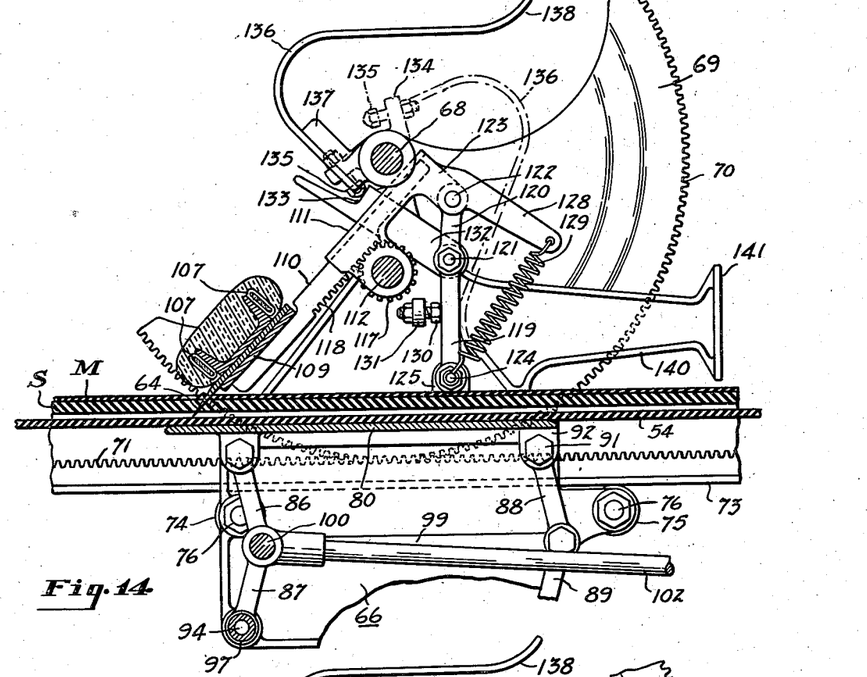
Fig. 14 is a vertical sectional detail with parts removed, similar to Fig. 10, showing the cutter carriage clamped to the conveyor belt and with the cutter completing the severing of the tread stock material on the conveyor.

The guides 111 are normally retained in approximately the position shown in Figs. 10 and 14 so that the reciprocable supports 110 carry the knife 64 over a path that is oblique to the plane of the conveyor belt 54 and the strip material S supported thereby, which is to be severed by the knife. In this manner an oblique cut is formed which bevels the ends of the severed material. Since the severed strips or pieces are to be placed or wrapped about the periphery of a tire to form the tread portion thereof, the beveling of the strip ends is extremely helpful in forming a neat and secure joint. The guides 111 are held in the oblique position described by means of links 119 and 120 which are pivotally connected together by means of pins 121. The links 120 are shorter than the links 119 and the lower ends thereof are bifurcated to receive the upper ends of the longer links at the pivot pins 121. Upper ends of the shorter links 120 are received between extension ears 123 of the guides 111 and pivoted thereto by pins 122, while the lower ends of the longer links 119 are received on pivot pins 124 secured in bosses 125 of the carriage side members 65 and 66.

Arms 128 extend rearwardly from the guides 111 and the ends thereof are connected by helical tension springs 129 to the pivot pins 124. The springs 129, accordingly, tend to rotate the guides 111 around the shaft 112, on which the guides are pivotally mounted, in a clockwise direction, as viewed in Figs. 10 and 14. In order to retain the guides 111 so as to hold the knife in cutting position, guide or stop studs 130 are adjustably threaded in bosses 131 extending inwardly from the carriage side members 65 and 66. The studs or stops 130 are positioned so as to engage the links 119 and prevent collapse of the toggle assemblies comprising the links 119 and 120.

Struts 132 are received on the link pivots 121 and extend forwardly therefrom between the shafts 68 and 112. The forward ends of the struts 132 have cutaway portions which form shoulders 133. Levers 134 are secured on the shaft 68 and at their ends receive threaded adjusting bolts 135 which are rotatable with the shaft 68 in the planes of the struts 132. When the carriage advances over a cutting stroke, the arms 134 are rotated from approximately the broken line position shown in Fig. 14 to the full line position shown in that figure. As the cutter 64 completes the severing of the strip material S at the end of the cutting stroke of the carriage, the heads of the adjusting bolts 135 engage the shoulders 133 of the struts 132, forcing the struts to the right, as viewed in Fig. 14, and moving the links 119 away from the supporting studs 130. When the pivots 121 have been thus moved beyond their center position between the end pivots 122 and 124 of the links, the latter are collapsed by the tension in the spring 129, which draws the arms 128 downwardly to pivot the guides 111 in a clockwise direction, as viewed in Fig. 14, to approximately the position shown in Fig. 15. This movement of the guides 111 carries the knife cutter 64 upwardly and away in a forward direction so as to separate the severed ends of the strip S. In this manner the strip ends are separated from one another before withdrawal of the cutter to prevent adhesion of the freshly cut, tacky surfaces. Furthermore, the positive lateral shifting of the cutter 64, just described, insures a complete severance of the strip ends and assists the initial impulse mechanism, to be later described, in separating the severed piece from the end of the continuous strip.

Upon retraction of the cutter carriage under the influence of the piston rod 102, the drive members 69 are rotated in a clockwise direction from substantially the position shown in Fig. 14 to the position shown in Fig. 10. During this movement of the carriage curved spring members 136 formed of resilient metal such as steel or brass and secured to extension portions 137 of the arms 134, move in an arcuate path so that their ends 138 engage the long links 119, as shown by the broken lines of Fig. 14, to move the guides 111 to their oblique positions relative to the conveyor belt 54 and to force the links 119 against the stops 130, the links being held thus by the tension springs 129. Thus the cutter carriage is reset or placed in readiness for the next succeeding work or cutting stroke.

Hubs 139 of the guides 111 extend axially along the shaft 112 to support the struts 132 and retain the latter in position to be engaged by the releasing studs 135.

Extending rearwardly from the carriage members 65 and 66 are horizontally disposed arm members 140 which support at their extremities circular disclike bumpers 141 made of suitable magnetic material, such as iron or steel. If desired, carriage members 65 and 66, together with the arms 140 and bumpers 141, may be integral and formed in a single casting operation of material such as iron or steel. Adjacent the starting position of the cutter carriage are electromagnets or solenoids 142 which are supported on members 143 adjustably secured in uprights 144 carried by the side frame members 72 and 73. The tops of the supports 144 are joined by a cross member 145. By energizing the electromagnet 142 through electrical conductors 150, as will later appear, after each return of the cutter carriage to starting position the magnets will draw the bumpers 141 snugly against the ends of the magnets so as to insure that the cutter carriage starts the next succeeding cutting or work stroke at precisely the same position on the supporting structure.

An adjustable tightener for conveyor belt 54 comprises threaded ends 147 threadedly received in stationary members 148 secured to the frame members 72 and 73. By rotation of the rods or screws 147 by means of hex portions 149, slides 146 may be adjusted or moved to vary the tension in the conveyor belt.

Figures 11, 12, 13:
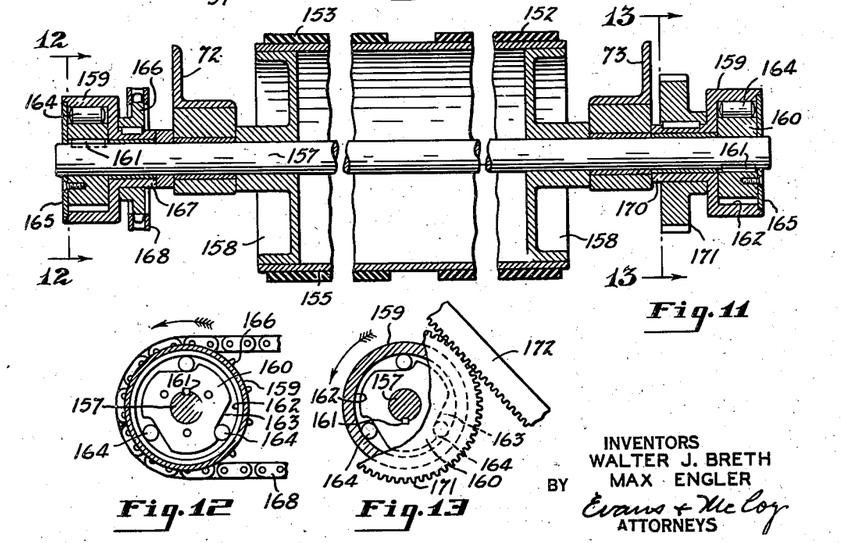
Fig. 11 is a foreshortened sectional view with parts broken away showing the overrunning clutches for driving the discharge conveyor and taken substantially on the line 11—11 of Fig. 7 and enlarged with respect thereto.
Fig. 12 is a sectional detail taken substantially on the line 12—12 of Fig. 11.
Fig. 13 is a sectional detail taken substantially on the line 13—13 of Fig. 11.

The discharge conveyor D comprises a pair of spaced parallel endless belts 152 and 153 carried around common end members or drums 154 and 155 rotatably mounted on shafts 156 and 157, respectively, journaled in the supporting structure 5. The rotatable member 155, like the rotatable end members previously mentioned in connection with the other endless belt conveyors, may be in the form of a cylindrical shell constructed of a suitable material such as steel or iron, the ends of which are carried by circular end members 158, Fig. 11. These end members of the rotatable member 155 are secured against rotation on the shaft 157 and the latter has ends which extend beyond the journals in the supporting structure 5. Rotatably mounted on these projecting ends of the shaft 157 are drums 159 of overrunning clutch structures. Disposed within each of the drums 159 is a cam member 160 secured against rotation on the shaft 157 by a key 161. Between cylindrical inner face 162 of each of the drums 159 and inclined faces 163 of the cam members 160 are wedge rollers or elements 164. Cover plates 165 received on the shaft 157 over the open ends of the drums 159 retain the wedge elements 164 in the tapered slots between the faces 162 and 163 of the overrunning clutches.

A sprocket 166 is secured against rotation on hub 167 of one of the overrunning clutches and is driven by a chain 168 trained over a sprocket 169 secured on driven shaft 57, previously mentioned in connection with the cutter conveyor. The overrunning clutch actuated by the chain 168 is arranged so that when the sprocket 166 is rotated in a counter-clockwise direction, as viewed in Fig. 4, by the chain 168, the rollers 164 become wedged between the cam member 160 and the drum 159, see Fig. 12, so as to establish a driving connection therebetween and rotate the shaft 157 and cylindrical member 155 in the same direction as the cylindrical rotatable member 55 of the cutter conveyor. Preferably, the sprocket 169 is slightly larger and has a greater number of teeth (such as one extra tooth) than the sprocket 166 so that the discharge conveyor D is actuated at a greater linear speed than the cutter conveyor, thereby slightly stretching the strip material being cut.

The other overrunning clutch has secured on the hub 170 thereof a spur gear 171, with which is meshed a rack 172 actuated by piston rod 173 which may be reciprocated by pneumatic or fluid pressure acting on a piston (not shown) secured on the rod and slidable in a cylinder 174. This cylinder is pivoted at 175 to the supporting structure 5 and is connected to a suitable source of fluid pressure, as will hereinafter appear. The rack 172 is guided by a saddle member 176 pivoted to the supporting structure and a spring 177 is arranged to retract the rack and force the piston rod 173 into the cylinder when the fluid pressure is released from the latter.

When the rack 172 is stationary the conveyor belts 152 and 153 are driven by the overrunning clutch rotated by the chain belt 168, the drum 159 of the overrunning clutch on which is mounted the gear 171 being held stationary by the rack 172 so that the enclosed cam member 160 rotates freely. Upon a rapid upward and forward movement of the rack bar 172 the drum member 159 of the overrunning clutch associated therewith is rotated rapidly in a counter-clockwise direction, as viewed in Fig. 14, so that the rollers 164 become wedged between the sloping surface 163 and the cylindrical face 162 of the clutch, thus establishing a driving connection through which the shaft 157 is momentarily rotated at a relatively rapid rate of speed by the rack 172 under the influence of the pneumatic or hydraulic device 174. While the discharge conveyor D is thus being accelerated or rotated rapidly by the rack 172 of the initial impulse mechanism just described, the driving connection between the drum member 159 of the overrunning clutch rotated by the sprocket 156 and the shaft 157 is momentarily interrupted and the clutch drum idles on the shaft 157 until the speed of the discharge conveyor D is reduced at the end of the initial impulse imparted thereto by the rack 172.

A control element or finger 180 is disposed in the space between the parallel belts 152 and 153 of the discharge conveyor and extends upwardly above the strip supporting surface of the upper runs of the belts so as to be engaged and displaced or actuated by the leading edge of the strip material 5 being advanced on the conveyor belts. This finger is pivoted at 181 on a traveling or movable holder 182 threadedly received and supported on a threaded rod 183 rotatably mounted in journals 184 which are secured to cross members 185 of the supporting structure. The journals 184 hold the rod 183 against endwise movement and the rod may be rotated from one side of the structure by a hand crank 186 secured on the projecting end of a rotatably mounted shaft 187 having a bevel gear 188 which meshes with a bevel gear 189 secured on the threaded rod 183. The holder 182 is provided with spaced lugs 213 engaging opposite sides of a stationary bar 214 for retaining the same with the finger 180 projecting therefrom upwardly between the belts 152 and 153. An extension 190 on the finger 180 engages roller 191 of an electric switch 192 to actuate the latter when the finger 180 is displaced or pivoted on the pin 181 by strip material advancing on the discharge conveyor D.

Figure 5:
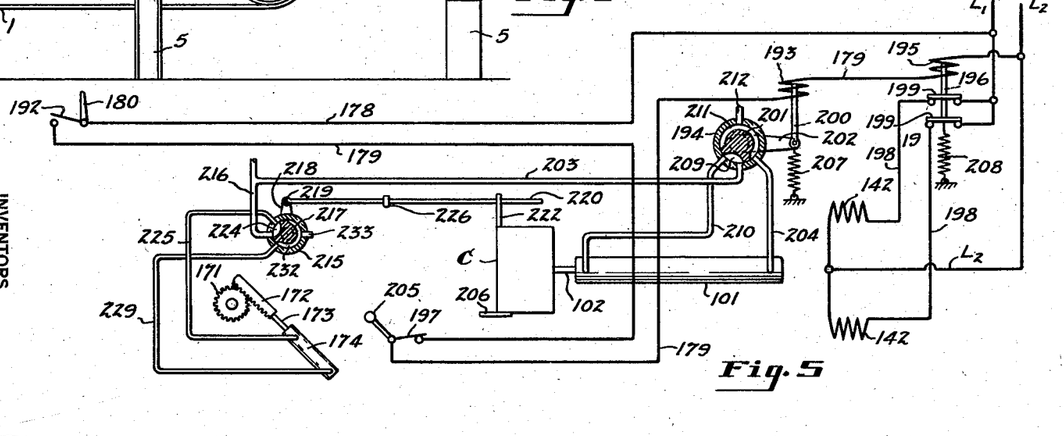
Fig. 5 is a diagrammatic drawing showing the controls for operating the hydraulic or pneumatic cylinders and the electromagnets or solenoids of the apparatus.

In Fig. 5 is diagrammatically shown the electrical control circuit which includes the switch 192 and governs the operation of the mechanism. The switch 192 is connected by wires 178 and 179 in series with an electromagnet or solenoid 193 for actuating a valve 194 which governs the flow of fluid into and out of the hydraulic or pneumatic carriage actuating cylinder 101 and an electromagnet or solenoid 195 which actuates armature 196 of a switch which controls the energization of the holding coils or solenoids 142 previously mentioned. One side of switch 192 is connected by the wire 178 to electric wire or conductor L—1 from a suitable source of electrical energy while the other side of the switch is connected by the wire 179 in series with a limit switch 197, to be later described, and the electromagnets 193 and 195, the latter being connected to electric wire or conductor L—2 from the electrical energy source. When the switch 192 is closed, upon engagement of the finger 180 by the leading end of a strip of plastic material advancing over the discharge conveyor, the electromagnet or solenoid 195 is energized to actuate the armature 196, thus opening the circuit for the holding coils 142 previously energized from the electrical energy source through conductors L—2 and 198, the latter being connected to conductor L—1 through contactors 199 attached to the armature 196. Simultaneously with the deenergization of the electromagnets 142 releasing the cutter carriage, armature 200 in the energized coil 193 rotates valve body 201 in the valve 194 by means of an arm 202 so that high pressure fluid from a suitable source of supply (not shown) flows through a tubular supply conduit 203, a passage in the valve 194, and into the right hand end of the cylinder 101, as viewed in Fig. 4, through a tubular conductor 204. In this manner the piston in the cylinder 101 is forced to the left, projecting the piston rod 102 and actuating the toggle links 86, 87, 88, and 89 in the manner previously described.

Referring to Fig. 7, the limit switch 197 is mounted on the supporting structure 5 adjacent the limit of movement of the cutter carriage at completion of a work or cutting stroke. Roller 205 of this switch is arranged to be engaged by a shoe 206 secured to one of the carriage side members so as to open the switch as the cutting stroke is completed. Accordingly, when the carriage has completed a work stroke and the knife 64 has severed the strip S, the electrical circuit through the coils 193 and 195 is broken by means of the switch 197, and the armature 200 and 196 are withdrawn from the coils by springs 207 and 208, respectively. Thus, the holding coils 142 are again energized through the contactors 199 and the valve 201 is moved to the position shown in Fig. 5, connecting the high pressure fluid conductor 203 through passage 209 in the valve 194 to tubular conductor 210 which leads to the left hand end of the hydraulic cylinder 101, as viewed in Figs. 4 and 10. This piston rod 102 is thereby retracted into the hydraulic cylinder under the influence of high pressure fluid from the conductor 210, the fluid forced out of the cylinder ahead of the piston being discharged through the conductor 204 which connects through a passage 211 in the valve 194 to a discharge conductor 212.

The flow of high pressure fluid into and out of the hydraulic or pneumatic cylinder 174 for actuating the initial impulse mechanism of the discharge conveyor is controlled by a valve 215. This valve is mounted on one side of the supporting structure 5, as shown in Fig. 7, and is connected to a source of fluid under pressure by means of a conduit 216. If desired, the conductor 216 may be a branch of the fluid supply conductor 203, as shown. A rotatable valve body 217 in the casing of the valve is actuated by an arm 218 to which is pivotally connected at 219 a control bar or rod 220. This rod is disposed adjacent and parallel to the path of the cutter carriage. The end of the rod 220 opposite the pivot 219 is slidably received in an aperture of a supporting bracket 221 mounted on the structure 5 adjacent one of the holding coils 142, previously mentioned. An extension member or arm 222 is formed on one of the carriage arms 140 and at one end has an aperture in which the rod 220 is slidably received. A helical coil tension spring 223 is connected to the valve arm 218 and to the supporting structure 5 so as to normally retain the valve arm in the upright position shown in Figs. 5 and 7, a suitable stop (not shown) being provided in the valve to limit movement of the valve body. In this position of the valve high pressure fluid enters a valve passage 224 which communicates with a conduit 225 connected to the upper end of the cylinder 174 so as to act on the piston and force the piston rod 173 into the cylinder, thus holding the rack 172 in retracted position.

As the cutter carriage advances over a work or cutting stroke the arm 222 slides over the rod 220 and at the end of the cutting stroke or movement the arm engages a stop 226 slidable on the rod 220, the limit of movement of the stop being determined by a locking element 227 which is adjustably secured to the rod 220. A helical compression spring 228 is provided on the rod 220 between the stop 226 and the locking element 227. Upon engagement of the stop 226 by the arm 222, the rod 220 is shifted to the right, as viewed in Figs. 6 and 7, to pivot the arm 218 against the tension spring 223 and to rotate the valve body 217 so that high pressure fluid from the tubular conduit 216 flows through the valve and into a tubular conduit 229 which communicates with the lower end of the initial impulse cylinder 174. Thereupon high pressure fluid enters the cylinder behind the piston to force the piston rod 173 rapidly out of the cylinder. This movement of the piston actuates the rack 172 which rapidly rotates the overrunning clutch shown in Fig. 13 to accelerate the discharge conveyor D and impart an initial impulse to the severed piece of strip S which has just been cut by the knife 64.

As the cutter carriage commences its return movement to starting position, the arm 222 is withdrawn from the stop 226, so that the rod 220 is thereupon shifted to the left, as viewed in Figs. 6 and 7, under the influence of the spring 223. In this manner the valve body 217 is restored to the position shown in Fig. 5 and high pressure fluid thereby admitted to the upper end of the cylinder 174 retracts the piston rod and the rack 172, the discharge conveyor thereupon being driven by the overrunning clutch shown in Fig. 12.

Desirably, the valve 194, together with the actuating solenoid 193 therefor, is mounted in a housing or container 230 secured to one side of the supporting structure 5, as shown in Figs. 6 and 7. Also, the switch for governing the holding means or coils 142 may be mounted in a box or container 231 adjacent the valve container 230. Fluid discharged from the cylinder 174 is carried back to the valve 215 and flows through a passage 232 therein to a discharge conduit 233.

During operation of the apparatus described above, a continuous strip of uncured tread rubber material may be advanced over the infeed conveyors I, passing successively over the endless belts 1, roller elements 7 of the intermediate conveyor 6, and the endless belt 15. As previously mentioned, the conveyor belt 15 may be run at a speed slightly less than that of the belt 1, so that the rubber is slightly compacted on the rollers 7. Also, one end of the intermediate conveyor 6 may be shifted laterally by means of the threaded rod 11 so as to center the strip S on the belt 15. The ultimate internal surface 49 of the strip S is disposed upwardly as the strip passes through the twist or bend 35 and carried onto the conveyor belt 36 of the assembling apparatus. Here the continuous strip of cushion stock or material M is applied to the upturned ultimate internal surface of the tread stock, being centered by the device 50 and pressed against the tread stock by the roller 51. As the composite strip moves off the end of the conveyor belt 36 it is received by the conveyor belt 54 of the cutting apparatus. The cutter carriage remains stationary or idle until the leading end or edge of the advancing strip is received by the parallel belts 152 and 153 of the discharge conveyor and engages the control finger 180 to displace the latter and close the electrical circuit which energizes the solenoids 193 and 195. Thereupon the cutter carriage, released by the holding coils 142, is energized for a forward or cutting stroke by the piston in the hydraulic cylinder 101. The movement of the piston rod 102 out of the cylinder 101 under the influence of high pressure fluid admitted thereto through the valve 194 actuates the toggle links under the platen 80 to force the platen upwardly to grip the belt 54, so that the cutter carriage and belt are clamped together for simultaneous movement.

As the cutter carriage advances with the conveyor belt from the full line position shown in Fig. 4 to approximately the broken line position of that figure, the drive members 69 are rotated by the racks 71 so as to drive the cutter 64 downwardly and forwardly at an oblique angle to the strip S and belt 54, severing the strip as shown in Fig. 14. As previously mentioned, the normally faster speed of the discharge conveyor D relative to the cutter carriage 54 tensions the strip S to facilitate the cutting of the same and to aid in separating the severed ends. At the instant that the severing of the strip is completed the bolts 135, carried by the arms 134, engage the shoulders 133 of the struts 132 and move the toggle links 119 and 120 away from the stop 130 so as to release the pivoted guides 111, which are thereupon rotated on the shaft 112 by the tension spring 129. This movement of the guides 111 carries the knife 64 upwardly and forwardly in the direction of movement of the strip to approximately the position shown in Fig. 15. This lateral shifting of the cutter or blade positively separates the severed ends of the strip so as to insure completion of the cutting operation and so that the tacky surfaces of the cut material are less apt to adhere to one another when the cutter is withdrawn.

Figure 15:
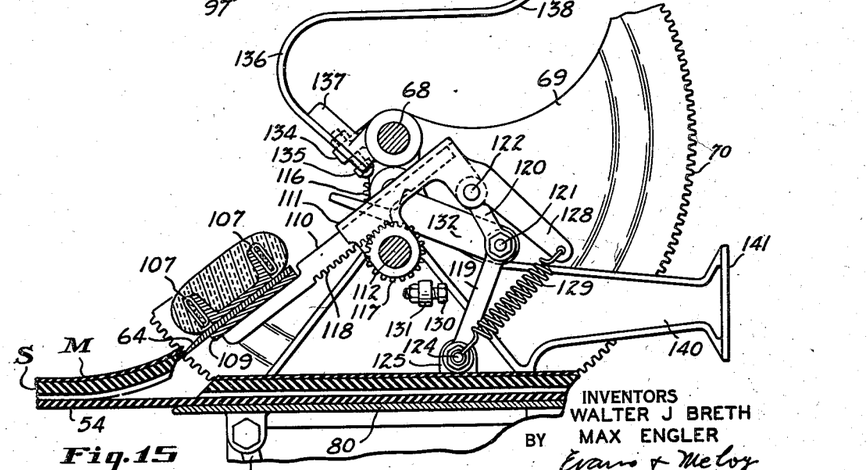
Fig. 15 is a view similar to Fig. 14 showing the same parts after the cutter guides have been rotated to shift the cutter blade laterally and separate the severed ends of the rubber tread stock material.

Simultaneously with the completion of the cutting of the strip the control rod 220 is shifted by the carriage arm 222 so as to open the valve 215 and admit high pressure fluid to the cylinder 174, which thereupon imparts an initial impulse to the discharge conveyor belts, accelerating the belts 152 and 153 so that they carry the severed piece of strip material forwardly at an increased rate of speed. This initial impulse action is arranged to occur so that the severed piece of strip is carried away while the severed ends of the strip are held apart by the cutter 64, as shown in Fig. 15.

Figure 2:
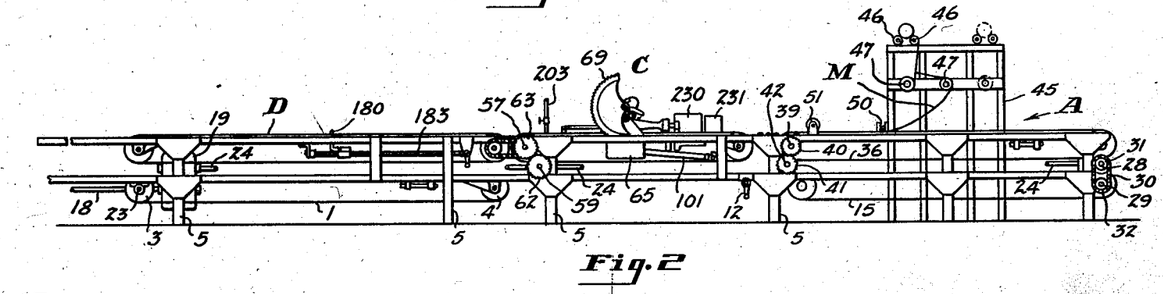
Fig. 2 is a side elevational view of the apparatus shown in Fig. 1.
Figure 3:
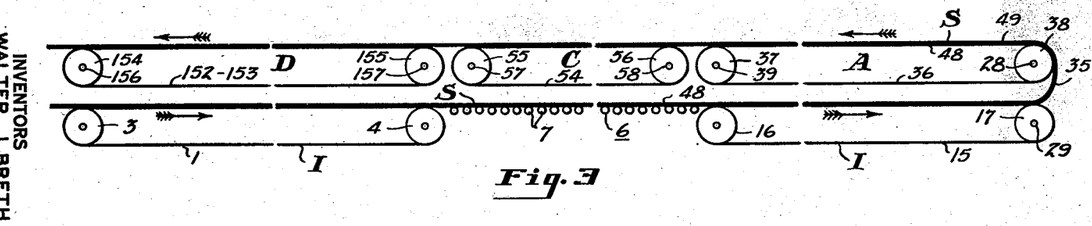
Fig. 3 is a diagrammatic side elevational view showing the path of a continuous strip of flexible rubber material over the several conveyors of the apparatus.

As appears from Figs. 2 and 4, the control finger 180 is a greater distance from the receiving end of the discharge conveyor belts than the distance of the cutter 64 from the discharge end of the cutter conveyor belt 54 when the severing of the strip is completed and the initial impulse mechanism is actuated to speed up the discharge conveyors. Accordingly, a greater length of the severed strip is supported by the discharge conveyors than by the cutter conveyor, so that the friction between the severed strip and the discharge conveyors is sufficient to overcome that between the strip and the cutter conveyor. Hence, the trailing end of the severed strip slides or is dragged forward a short distance on the cutter conveyor during the acceleration of the discharge conveyors under the influence of the initial impulse mechanism.

The present invention thus provides a novel method of forming and severing composite tread rubber strips for vehicle tires in which strips of tread stock material and cushioning stock material are combined in a continuous operation and fed to a cutting apparatus which severs the composite strip by an oblique cut which provides beveled ends on the pieces severed from the end of the continuously advancing severed strip. Additionally, the method involves the retention of the cutter between the severed ends of the strip until the latter are positively separated from one another, thus avoiding adhesion of the ends after they have once been severed, and the positive separation of the severed ends by a lateral shifting of the cutting knife.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim is:

1. Apparatus of the character described comprising in combination, a supporting structure, an endless conveyor thereon for supporting and advancing strip material, a carriage movable in parallelism with the conveyor, a knife on the carriage, and means on the carriage interconnected with the supporting structure for driving the knife to sever strip material on the conveyor in response to movement of the carriage.

2. Apparatus of the character described comprising in combination, a supporting structure, an endless conveyor thereon for supporting and advancing strip material, a carriage movable in parallelism with the conveyor, means for securing the carriage to the conveyor for synchronous movement therewith, a knife on the carriage, and means on the carriage interconnected with the supporting structure for driving the knife to sever strip material on the conveyor in response to movement of the carriage.

3. Apparatus of the character described comprising in combination, a supporting structure, an endless conveyor thereon for supporting and advancing strip material, a carriage movable in parallelism with the conveyor, a knife on the carriage, a rack on the supporting structure, and means on the carriage including a member engageable with the rack for driving the knife to sever strip material on the conveyor in response to movement of the carriage.

4. Apparatus of the character described comprising in combination, a supporting structure, an endless conveyor thereon for supporting and advancing strip material, a carriage movable in parallelism with the conveyor, a knife on the carriage, rotatable gear means on the carriage for actuating the knife, a rack on the supporting structure, and means on the carriage including a member engageable with the rack for driving the gear means to actuate the knife in response to movement of the carriage.

5. Apparatus of the character described comprising in combination, a supporting structure, an endless conveyor thereon for supporting and advancing strip material, a carriage movable in parallelism with the conveyor, means for securing the carriage to the conveyor for synchronous movement therewith, a knife on the carriage, rotatable gear means on the carriage for actuating the knife, a rack on the supporting structure, and means on the carriage including a member engageable with the rack for driving the gear means to actuate the knife in response to movement of the carriage.

6. Apparatus of the character described comprising in combination, a supporting structure, a conveyor for supporting and advancing strip material, a carriage movable in the same direction as material on the conveyor, clamp means for securing the carriage to the conveyor for synchronous movement therewith, means for actuating the clamp means and for driving the carriage, control means responsive to the movement of strip material on the conveyor for starting the clamp actuating and carriage driving means, and a cutter on the carriage for severing strip material.

7. Apparatus for the character described comprising in combination, a supporting structure, a conveyor for supporting and advancing strip material, a carriage movable in the same direction as material on the conveyor, holding means on the structure for resisting movement of the carriage, drive means for the carriage, control means responsive to the movement of strip material on the conveyor for releasing the holding means and starting the drive means, and a cutter on the carriage for severing strip material.

8. Apparatus for the character described comprising in combination, a supporting structure, a conveyor for supporting and advancing strip material, a carriage movable in the same direction as material on the conveyor, clamp means for securing the carriage to the conveyor for synchronous movement therewith, means for actuating the clamp means and for driving the carriage, holding means on the structure for resisting movement of the carriage, control means responsive to the movement of strip material on the conveyor for releasing the holding means and for starting the clamp actuating and carriage driving means, and a cutter on the carriage for severing strip material.

9. Apparatus of the character described comprising in combination, a supporting structure, a conveyor for supporting and advancing strip material, a carriage on the structure movable in the same direction as material on the conveyor, a guide pivotally mounted on the carriage, a cutter reciprocable on the guide, means for turning the guide to shift the cutter laterally after a cutting stroke.

10. Apparatus of the character described comprising in combination a supporting structure, a conveyor for supporting and advancing strip material, a carriage on the structure movable in the same direction as material on the conveyor, a guide pivotally mounted on the carriage, a cutter reciprocable on the guide, a rotatable shaft, means engageable with the supporting structure to rotate the shaft during movement of the carriage, means connecting the shaft and cutter to actuate the same, and means for turning the guide to shift the cutter laterally after a cutting stroke.

11. Apparatus of the character described comprising in combination a supporting structure, a conveyor for supporting and advancing strip material, a movable carriage on the structure, an actuating member on the carriage, a pivotally mounted guide on the carriage, a reciprocable cutter on the guide, means interconnecting the cutter and the actuating member to drive the cutter, means for holding the guide with the cutter in cutting position, spring means for turning the guide to shift the cutter laterally, and means movable with the actuating member to release the holding means and allow the spring means to shift the guide and cutter.

12. Apparatus of the character described comprising a first conveyor for supporting and advancing continuous strip material, a movable cutter associated with the conveyor to sever material advancing thereon, a second conveyor for receiving and advancing severed strip material from the first conveyor, drive means for the conveyors, and means operating in timed relation with the cutter to momentarily increase the speed of the second conveyor after each strip severing movement of the cutter.

13. Apparatus of the character described comprising a first conveyor for supporting and advancing continuous strip material, a movable cutter associated with the conveyor to sever material advancing thereon, a second conveyor for receiving and advancing severed strip material from the first conveyor, drive means for the conveyors, and an impulse mechanism including an overrunning clutch for momentarily increasing the speed of the second conveyor, said mechanism being timed with the cutter to effect said speed increase after each strip severing movement of the cutter.

14. Apparatus of the character described comprising a first conveyor for supporting and advancing continuous strip material, a movable cutter associated with the conveyor to sever material advancing thereon, actuating means for the cutter, a second conveyor for receiving and advancing severed strip material from the first conveyor, drive means for the conveyors, said drive means including an impulse mechanism for momentarily increasing the speed of the second conveyor, and controls for starting the cutter actuating means and the impulse mechanism, said controls including an element associated with the second conveyor and engageable with strip material advancing thereon to start the cutter actuating means.

15. The method of cutting a continuous strip of plastic material into pieces which comprises supporting and advancing the strip, moving a cutter synchronously with the strip, passing the moving cutter obliquely through the strip to sever the same and provide a beveled cut edge, shifting the cutter laterally before withdrawing the same from the strip to separate the severed ends, and carrying the severed piece away faster than the strip is advanced to prevent contact between the severed ends.

16. The method of cutting a continuous strip of plastic material into pieces which comprises supporting and advancing the strip, moving a cutter synchronously with the strip, passing the moving cutter obliquely and downwardly through the strip to sever the same and provide beveled edges one of which overlaps the other, shifting the cutter laterally before withdrawing the same from between the beveled edges to raise the uppermost edge and separate the same from the lowermost edge, and carrying the severed piece away faster than the strip is advanced to prevent contact between the severed ends.

17. The method of cutting a continuous strip of plastic material into pieces, which comprises supporting and advancing the strip, moving a cutter synchronously with the strip, passing the moving cutter through the strip to sever the same, shifting the cutter laterally before withdrawing the same from the strip to separate the severed ends, and carrying the severed piece away faster than the strip is advanced to prevent contact between the severed ends.

18. Apparatus of the character described comprising in combination an endless conveyor for supporting strip material on the upper run thereof, means for driving the conveyor to advance the supported material, a carriage supported for movement paralleling the conveyor, a knife on the carriage, means actuable by the carriage movement for operating the knife to sever the advancing material, and means connecting the carriage and the conveyor for synchronous movement, said last means including a member movable in the direction of the conveyor and having connection with the carriage to apply a motivating force to the latter.

19. Apparatus of the character described comprising in combination an endless conveyor for supporting strip material on the upper run thereof, means for driving the conveyor to advance the supported material, a carriage supported for movement paralleling the conveyor, a knife on the carriage, means actuable by the carriage movement for operating the knife to sever the advancing material, means for clamping the carriage to the conveyor for synchronous movement therewith, and a driven member movable to first actuate the clamping means and to then apply a motivating force to the carriage.

20. In apparatus for handling a continuous strip of plastic material, a pair of spaced endless belt conveyors disposed to successively receive and advance the strip, means for driving said conveyors, an intermediate steering conveyor interposed between said pair of conveyors and over which the strip material is advanced solely by forces within the strip, and means supporting the steering conveyor for lateral shifting movement.

21. In apparatus for handling a continuous strip of plastic material, a pair of spaced endless belt conveyors disposed to successively receive and advance the strip, means for driving said conveyors, an intermediate steering conveyor interposed between said pair of conveyors and over which the strip material is advanced solely by forces within the strip, said steering conveyor including a frame and means mounting the frame for pivotal movement in a horizontal plane, and means for shifting one end of the frame laterally to move the steering conveyor about said pivotal mounting.

22. In apparatus for handling a continuous strip of plastic material, a pair of conveyors disposed to successively receive and advance the strip and having spaced ends, a vertical pivot adjacent one of said conveyor ends, an intermediate steering conveyor extending between said conveyor ends and mounted on said pivot, and means for swinging the steering conveyor horizontally about the pivot to guide strip material passing thereover from one of said pair of conveyors to the other.

23. In apparatus for handling a continuous strip of plastic material, a pair of conveyors disposed to successively receive and advance the strip and having spaced ends, means for driving the conveyors at different rates of speed to effect a change in the longitudinal dimension of the strip as the latter moves between said ends, and an intermediate conveyor of greater length than the strip width disposed between said conveyor ends to support the strip during said dimensional change, said intermediate conveyor being of the non-driven type whereby the strip is advanced thereover solely by forces within the strip.

24. In apparatus for handling a continuous strip of plastic material, a pair of conveyors disposed to successively receive and advance the strip and having spaced ends, means for driving the conveyors at different rates of speed to effect a change in the longitudinal dimension of the strip as the latter moves between said ends, and a plurality of rollers disposed in side by side relation between said conveyor ends to support the strip during said dimensional change.

25. In apparatus for handling a continuous strip of plastic material, a pair of conveyors disposed to successively receive and advance the strip and having spaced ends, means for driving the conveyors at different rates of speed to effect a change in the longitudinal dimension of the strip as the latter moves between said ends, and an intermediate conveyor of greater length than the strip width disposed between said conveyor ends to support the strip during said dimensional change, said intermediate conveyor having a plurality of rollers disposed in side by side relation to engage the underside of the strip material.

26. In apparatus for handling a continuous strip of plastic material, a driven conveyor for supporting and advancing the strip, a roller conveyor extending as a continuation of the driven conveyor, said roller conveyor being of the non-driven type whereby the strip is moved thereover solely by forces within the strip, and means mounting the roller conveyor for pivotal movement about a vertical axis to steer the advancing strip.

27. Apparatus of the character described comprising in combination, a supporting structure, a conveyor on the structure for supporting and advancing a continuous strip of plastic material, a reciprocable carriage movable from a starting position in parallelism with an advancing strip, a cutter on the carriage actuable to sever such strip, means for holding the carriage in predetermined position relative to the supporting structure at said starting position including an electromagnet and a stop attractable thereby, and means controlling the energization of the electromagnet to hold the stop against the magnet during the movement of the strip over the conveyor and to release the stop for movement of the carriage with the strip in response to the movement of a predetermined length of strip material over the conveyor.

28. Apparatus of the character described comprising in combination, a supporting structure, a conveyor for supporting and advancing strip material, a carriage movable in the same direction as the material on the conveyor, clamp means for securing the carriage to the conveyor for synchronous movement therewith, means for actuating the clamp means and for driving the carriage, control means responsive to the movement of strip material on the conveyor for starting the clamp actuating and carriage driving means, a cutter on the carriage for severing strip material, and mechanism connecting the cutter and the supporting structure to actuate the cutter by the carriage movement.

29. Apparatus of the character described comprising in combination, a supporting structure, a conveyor for advancing a continuous strip of plastic material, a carriage on the structure and having a cutter movable to sever the strip, means for holding the carriage in predetermined position relative to the structure including an electromagnet and an energizing circuit therefor, a switch in said circuit, and a movable finger engageable with the advancing strip and having connection with the switch to actuate the latter.

30. Apparatus of the character described comprising in combination, a supporting structure, a conveyor for advancing a continuous strip of plastic material, a carriage on the structure and having a cutter movable to sever the strip, means for moving the carriage with the strip on the conveyor, a control for initiating operation of the moving means and including a finger engageable with the strip, and a threaded rod rotatably carried by the structure and having connection with the finger to shift the latter in the direction of movement of the strip.

31. Apparatus of the character described comprising in combination, a supporting structure, a conveyor for advancing a continuous strip of plastic material, a carriage on the structure and having a cutter movable to sever the strip, fluid operated means for moving the carriage with the strip on the conveyor, an electrically operated valve controlling the supply of fluid to said means, electric means for holding the carriage in predetermined position relative to the structure, a circuit common to the valve and the holding means including switch means, and a movable finger engageable with the advancing strip and having connection with the switch means to actuate the latter and thereby simultaneously control the operation of the carriage moving means and the carriage holding means.

32. Apparatus of the character described comprising in combination, a supporting structure, a conveyor for advancing a continuous strip of plastic material, a carriage on the structure and having a cutter movable to sever the strip, fluid operated means for moving the carriage with the strip on the conveyor, an electrically operated valve controlling the supply of fluid to said means, an electromagnet on the structure and a member on the carriage engageable therewith to hold the carriage in predetermined position relative to the structure, a circuit including switch means for simultaneously operating the valve to supply fluid to the carriage moving means and de-energizing the electromagnet to release the carriage, and means engageable with the advancing strip and having connection with the switch means to actuate the latter.

33. Apparatus of the character described comprising in combination, an endless belt conveyor for supporting and advancing a continuous strip of plastic material, a pair of endless belts disposed in side by side relation as a continuation of said conveyor and means actuating the pair of belts to move in unison and forward said strip material, a reciprocable carriage movable with the conveyor and having a cutter for severing said strip, and means governing the carriage movement including a yieldable finger extending upwardly between said pair of belts in the path of strip material being forwarded thereby.

34. Apparatus of the character described comprising in combination, an endless belt conveyor for supporting and advancing a continuous strip of plastic material, a pair of endless belts disposed in side by side relation as a continuation of said conveyor and means actuating the pair of belts to move in unison and forward said strip material, a carriage and means supporting the same for reciprocation in parallelism with the conveyor, means for clamping the carriage to the conveyor belt for movement therewith, a cutter on the carriage for severing the strip, and means governing the clamping means including a yieldable finger extending upwardly between said pair of belts in the path of strip material being forwarded thereby.

35. Apparatus of the character described comprising a conveyor for supporting and advancing a continuous strip of plastic material during the severing of the latter, a conveyor for receiving strip material from the advancing conveyor and forwarding the received strip, drive means for the forwarding conveyor including shaft means and a pair of overrunning clutches on the shaft means, means interconnecting the advancing conveyor and one of the clutches for actuating the conveyors in synchronous relation, and an impulse mechanism having connection with the other clutch to impart a momentary speed increase to the forwarding conveyor.

36. Apparatus of the character described comprising a conveyor for supporting and advancing a continuous strip of plastic material during the severing of the latter, a conveyor for receiving strip material from the advancing conveyor and forwarding the received strip, drive means for the forwarding conveyor including shaft means and a pair of overrunning clutches on the shaft means, means interconnecting the advancing conveyor and one of the clutches for actuating the conveyors in synchronous relation, a pinion having connection with the other clutch, a rack engageable with the pinion, and fluid actuable means for moving the rack to thereby operate the other clutch and impart a momentary speed increase to the forwarding conveyor.

37. Apparatus of the character described comprising in combination, an endless conveyor belt and means supporting and actuating the same to receive continuous strip material on the upper run thereof and to advance the received material, a carriage and means supporting the same for reciprocation in parallelism with the belt run, clamp means on the carriage actuable to engage opposite sides of the belt run and grip the latter for synchronous movement of the carriage and the belt, and a cutter on the carriage for severing an advancing strip.

38. Apparatus of the character described comprising in combination, an endless conveyor belt and means supporting and actuating the same to receive continuous strip material on the upper run thereof and to advance the received material, a carriage and means supporting the same for reciprocation in parallelism with the belt run, clamp members on the carriage above and below the belt run, toggle means for actuating the clamp members to grip the belt run therebetween and thereby move the carriage in synchronism with the conveyor, and a cutter on the carriage for severing an advancing strip.

39. Apparatus of the character described comprising in combination, an endless conveyor belt and means supporting and actuating the same to receive continuous strip material on the upper run thereof and to advance the received material, a carriage and means supporting the same for reciprocation in parallelism with the belt run, clamp members on the carriage above and below the belt run, toggle means for actuating the clamp members to grip the belt run therebetween and thereby move the carriage in synchronism with the conveyor, a cutter on the carriage for severing an advancing strip, and a driven member having connection with the toggle means and movable to first effect belt gripping actuation of the clamp members and to then force the carriage in the direction of travel of the belt run.

40. Apparatus of the character described comprising a conveyor for supporting and advancing strip material, a carriage and means supporting the same for reciprocation in parallelism with material advancing on the conveyor, a guide mounted on the carriage for movement relative thereto, a cutter movable on the guide, means for actuating the cutter to sever advancing material, and means for moving the guide to shift the cutter laterally after severing the material.

41. Apparatus of the character described comprising a conveyor for supporting and advancing strip material, a carriage and means supporting the same for reciprocation in parallelism with material advancing on the conveyor, a guide mounted on the carriage for movement relative thereto, a cutter movable on the guide, means for normally holding the guide in position so that the cutter movement is at an oblique angle to advancing material, means operative to move the cutter through supported material to sever the same during travel of the carriage in one direction, means for moving the guide to shift the cutter laterally after severance of the material, and means associated with the cutter moving means to return the guide to said position during travel of the carriage in a reverse direction.

42. Apparatus of the character described comprising a conveyor for supporting and advancing strip material, a carriage and means supporting the same for reciprocation in parallelism with material advancing on the conveyor, a guide mounted on the carriage for movement relative thereto, a cutter movable on the guide, a toggle joint and spring combination having connection with the guide to hold the latter in position for movement of the cutter thereon at an angle to advancing material, means operative to move the cutter through supported material to sever the material during travel of the carriage in one direction, means for moving the toggle joint so that the spring collapses the latter and shifts the cutter laterally after severance of the material, and means associated with the cutter moving means to return the guide to said position during travel of the carriage in a reverse direction.

WALTER J. BRETH.
MAX ENGLER.